United States Patent
Takahashi et al.

(10) Patent No.: US 11,562,396 B2
(45) Date of Patent: Jan. 24, 2023

(54) SERVER DEVICE, TERMINAL DEVICE, AND COMPUTER READABLE RECORDING MEDIUM

(71) Applicant: TOYOTA JIDOSHA KABUSHIKI KAISHA, Toyota (JP)

(72) Inventors: Yoshihiko Takahashi, Miyoshi (JP); Yuki Tatsumoto, Miyoshi (JP); Keisuke Nishinaka, Nagoya (JP); Hiroki Tamura, Shinagawa-ku (JP); Yoshitaka Nishikawa, Nagakute (JP); Kenji Gotoh, Minato-ku (JP); Kota Kato, Abiko (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/214,259

(22) Filed: Mar. 26, 2021

(65) Prior Publication Data
US 2021/0304249 A1  Sep. 30, 2021

(30) Foreign Application Priority Data
Mar. 27, 2020  (JP) .............................. JP2020-058015

(51) Int. Cl.
*G06Q 30/00* (2012.01)
*G06Q 30/02* (2012.01)
(52) U.S. Cl.
CPC .............................. *G06Q 30/0255* (2013.01)

(58) Field of Classification Search
CPC ........................................... G06Q 30/02–0277
See application file for complete search history.

(56) References Cited

U.S. PATENT DOCUMENTS

| | | | |
|---|---|---|---|
| 2006/0129313 A1* | 6/2006 | Becker | G08G 1/096822 701/533 |
| 2014/0257989 A1* | 9/2014 | Prakah-Asante | G01C 21/3697 705/14.63 |
| 2017/0337584 A1* | 11/2017 | Najdecki | G06Q 30/0257 |
| 2020/0098007 A1* | 3/2020 | Sakurada | H04W 4/029 |

FOREIGN PATENT DOCUMENTS

JP  2004-069318 A  3/2004

OTHER PUBLICATIONS

Clarke, David Langton "Errors in the perception of motion in depth: Effects of a structured field-of-view", North Carolina State University, ProQuest Dissertations Publishing, 1998. (Year: 1998).*

\* cited by examiner

*Primary Examiner* — Raquel Alvarez
(74) *Attorney, Agent, or Firm* — Oliff PLC (57) ABSTRACT

A server includes a processor including hardware, the processor is configured to: record information about a traveling route of a vehicle and a driver of the vehicle as action history information; select a service to be provided to the driver based on the action history information; and provide the selected service to the driver.

14 Claims, 5 Drawing Sheets

SERVER DEVICE, TERMINAL DEVICE, AND COMPUTER READABLE RECORDING MEDIUM

The present application claims priority to and incorporates by reference the entire contents of Japanese Patent Application No. 2020-058015 filed in Japan on Mar. 27, 2020.

BACKGROUND

The present disclosure relates to a server device, a terminal device, and a computer readable recording medium.

JP 2004-69318 A discloses a technique for presenting advertisement data around a vehicle traveling route from a current location to a destination to a vehicle occupant.

SUMMARY

There is a need for a server device, a terminal device, and a computer readable recording medium capable of providing a service according to a vehicle or a driver of the vehicle.

According to one aspect of the present disclosure, there is provided a server including a processor including hardware, the processor is configured to: record information about a traveling route of a vehicle and a driver of the vehicle as action history information; select a service to be provided to the driver based on the action history information; and provide the selected service to the driver.

DETAILED DESCRIPTION

Hereinafter, a wallet system according to an embodiment will be described with reference to the drawings.

First, a configuration of the wallet system according to the embodiment will be described with reference to FIGS. 1 to 6.

Figure 1:
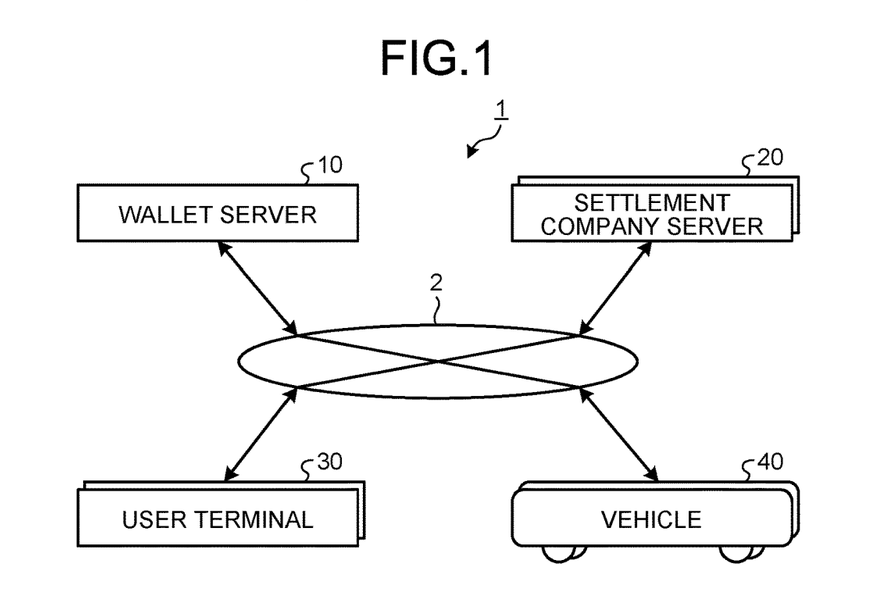
FIG. 1 is a schematic diagram illustrating a configuration of a wallet system according to an embodiment.

As illustrated in FIG. 1, a wallet system 1 according to the embodiment includes a wallet server 10, a settlement company server 20, a user terminal 30, and a vehicle 40 capable of communicating information with each other via a network 2.

The network 2 includes the Internet, a mobile phone line network, and the like. The network 2 is, for example, a public communication network such as the Internet, and may include other communication networks such as a wide area network (WAN), a communication network of a telephone such as a mobile phone, and a wireless communication network such as WiFi (registered trademark).

Figure 2:
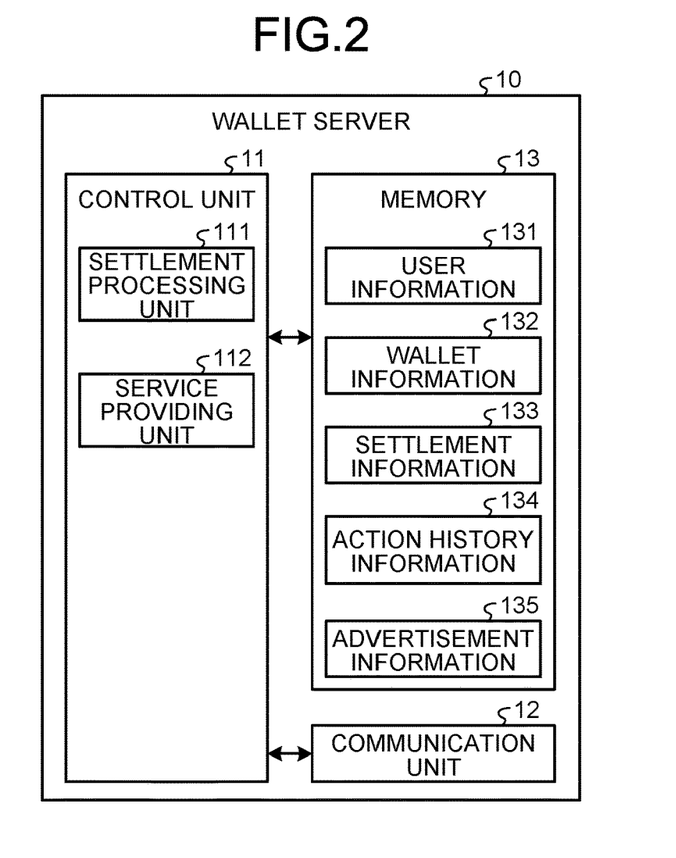
FIG. 2 is a block diagram illustrating a configuration of a wallet server illustrated in FIG. 1.

The wallet server 10 is an information processing device that collectively manages the wallet system 1, and is managed by an administrator of the wallet system 1. As illustrated in FIG. 2, the wallet server 10 includes a control unit 11, a communication unit 12, and a memory 13.

The control unit 11 includes a processor such as a central processing unit (CPU), a digital signal processor (DSP), or a field-programmable gate array (FPGA) having hardware, and a main memory such as a random access memory (RAM), a read only memory (ROM), or the like. The control unit 11 loads a computer program stored in the memory 13 into the work area of the main memory and executes the computer program, and controls each of the components and the like through the execution of the computer program to implement functions that meet a predetermined purpose. In the present embodiment, the control unit 11 functions as a settlement processing unit 111 and a service providing unit 112 by executing a computer program. The functions of these units will be described below.

The communication unit 12 includes, for example, a local area network (LAN) interface board, a wireless communication circuit for wireless communication, and the like. The LAN interface board and the wireless communication circuit are connected to the network 2 such as the Internet, which is a public communication network. The communication unit 12 is connected to the network 2 and performs information communication with the settlement company server 20, the user terminal 30, and the vehicle 40 via the network 2.

The memory 13 includes a recording medium such as an erasable programmable ROM (EPROM), a hard disk drive (HDD), and a removable medium. Examples of the removable medium include a disc recording medium such as a universal serial bus (USB) memory, a compact disc (CD), a digital versatile disc (DVD), and a Blu-ray (registered trademark) disc (BD). The memory 13 may store an operating system (OS), various programs, various tables, various databases, and the like. In the present embodiment, the memory 13 stores user information 131, wallet information 132, settlement information 133, and action history information 134 for each user who uses the wallet system 1. In addition, advertisement information 135 is stored in the memory 13.

The user information 131 is information about a user who uses the wallet system 1. As the user information 131, the user ID, password, user name, user contact information (for example, an address, a telephone number, an email address, etc.), a usage registration history, information about a payment method registered as a deposit method, information about a payment method registered as a settlement method, a code number at the time of settlement, and the like of a user who has registered to use the wallet system 1 may be exemplified. Out of the user information 131, the user ID and the password are used for authentication processing such as login to the wallet server 10.

The wallet information 132 is information about a wallet of the wallet system 1. The wallet indicates a virtual deposit/withdrawal account of electronic money. Examples of the wallet information 132 include a user ID, an electronic money balance, an electronic money deposit history, an electronic money usage history, and the like.

The settlement information 133 is information about settlement of the wallet system 1. Examples of the settlement information 133 include a user ID, a settlement method used for settlement (for example, electronic money payment (contactless settlement), scan payment, code payment, etc.), a settlement history, and the like.

The action history information 134 is action history information of a user transmitted from the vehicle 40. The action history information includes vehicle-riding scene information of the user, and vehicle information and position information of the vehicle 40. Details of these pieces of information will be described below.

The advertisement information 135 is advertisement information of stores and products provided to users who use the wallet system 1. In the present embodiment, the advertisement information 135 includes information indicating the genre of a store or a product to be advertised, information about the address or telephone number of the store to be advertised, and advertisement data. The advertisement information 135 may include coupon information that may be used at the store.

Figure 3:
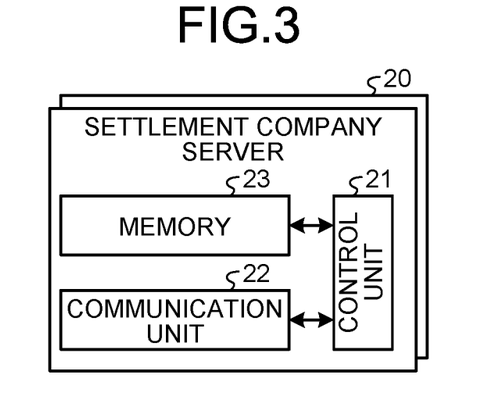
FIG. 3 is a block diagram illustrating a configuration of a settlement company server illustrated in FIG. 1.

The settlement company server 20 is a server for managing an account and a credit card of a user, and is provided in a financial institution (for example, a bank, a shinkin bank, a credit union, a labor bank, etc.) and a credit card company. As illustrated in FIG. 3, the settlement company server 20 includes a control unit 21, a communication unit 22, and a memory 23. The control unit 21, the communication unit 22, and the memory 23 have physical configurations similar to the control unit 11, the communication unit 12, and the memory 13, respectively.

The memory 23 stores account information and credit card information for each of users who use the wallet system 1. As the account information, a name of a user, an account number, an account balance, a deposit/withdrawal history, and the like may be exemplified. Further, as the credit card information, a name of a user, a credit card number, a credit card expiry date, a usage limit, a card usage history, and the like may be exemplified.

Figure 4:
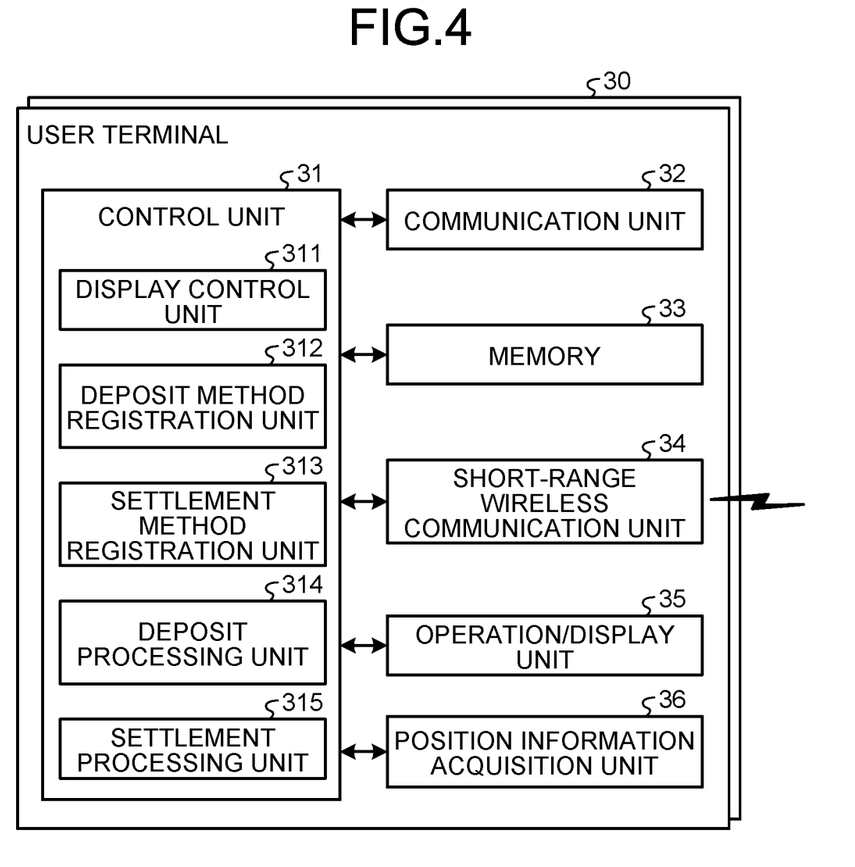
FIG. 4 is a block diagram illustrating a configuration of a user terminal illustrated in FIG. 1.

The user terminal 30 is a computer terminal used by a user. As the user terminal 30, a smartphone, a mobile phone, a tablet terminal, a wearable computer, a personal computer, a route guidance device mounted on a vehicle, or the like owned by the user may be exemplified. The user terminal 30 may be any terminal as long as the terminal may communicate with the wallet server 10.

As illustrated in FIG. 4, the user terminal 30 includes a control unit 31, a communication unit 32, a memory 33, a short-range wireless communication unit 34, an operation/display unit 35, and a position information acquisition unit 36. The control unit 31, the communication unit 32, and the memory 33 have physical configurations similar to the control unit 11, the communication unit 12, and the memory 13 described above, respectively. The control unit 31 functions as a display control unit 311, a deposit method registration unit 312, a settlement method registration unit 313, a deposit processing unit 314, and a settlement processing unit 315 through the execution of a computer program.

The display control unit 311 controls display contents on the operation/display unit 35. The display control unit 311 displays, on the operation/display unit 35 based on an operation of a user (a touch operation, a flick operation, etc.), a member registration screen when the user performs member registration, a login screen when the user logs in to the wallet system 1, a deposit screen when the user deposits electronic money to the wallet, a settlement screen when the user makes settlement, a usage history screen indicating a list of usage histories such as settlement, a payment history detail screen indicating details of the payment history, a code payment screen, a scan payment screen, and the like. In addition, the display control unit 311 transitions screen to screen based on an operation of a user. Various configurations may be adopted as screen configurations of the settlement screen, usage history screen, payment history details screen, and code payment screen.

The deposit method registration unit 312 registers a deposit method for depositing electronic money. Specifically, the deposit method registration unit 312 transmits a deposit method registration request to the wallet server 10 to cause the wallet server 10 to register a plurality of different payment methods (for example, a bank account, a credit card, a virtual credit card, etc.) operated by a plurality of companies as deposit methods to the wallet. The control unit 11 of the wallet server 10 that has received the deposit method registration request from the deposit method registration unit 312 stores the payment methods included in the deposit method registration request as the user information 131 in the memory 13, thereby registering the payment methods as the deposit method.

The deposit method registration unit 312 registers the payment methods to be registered as settlement methods also as deposit methods. That is, when a settlement method registration request is transmitted from the settlement method registration unit 313 to the wallet server 10, the deposit method registration unit 312 transmits a deposit method registration request, which causes the payment methods included in the settlement method registration request to be registered as deposit methods, to the wallet server 10. The control unit 11 of the wallet server 10 that has received the deposit method registration request from the deposit method registration unit 312 stores the payment methods included in the deposit method registration request as the user information 131 in the memory 13, thereby registering the payment methods as the deposit methods.

Figure 5:
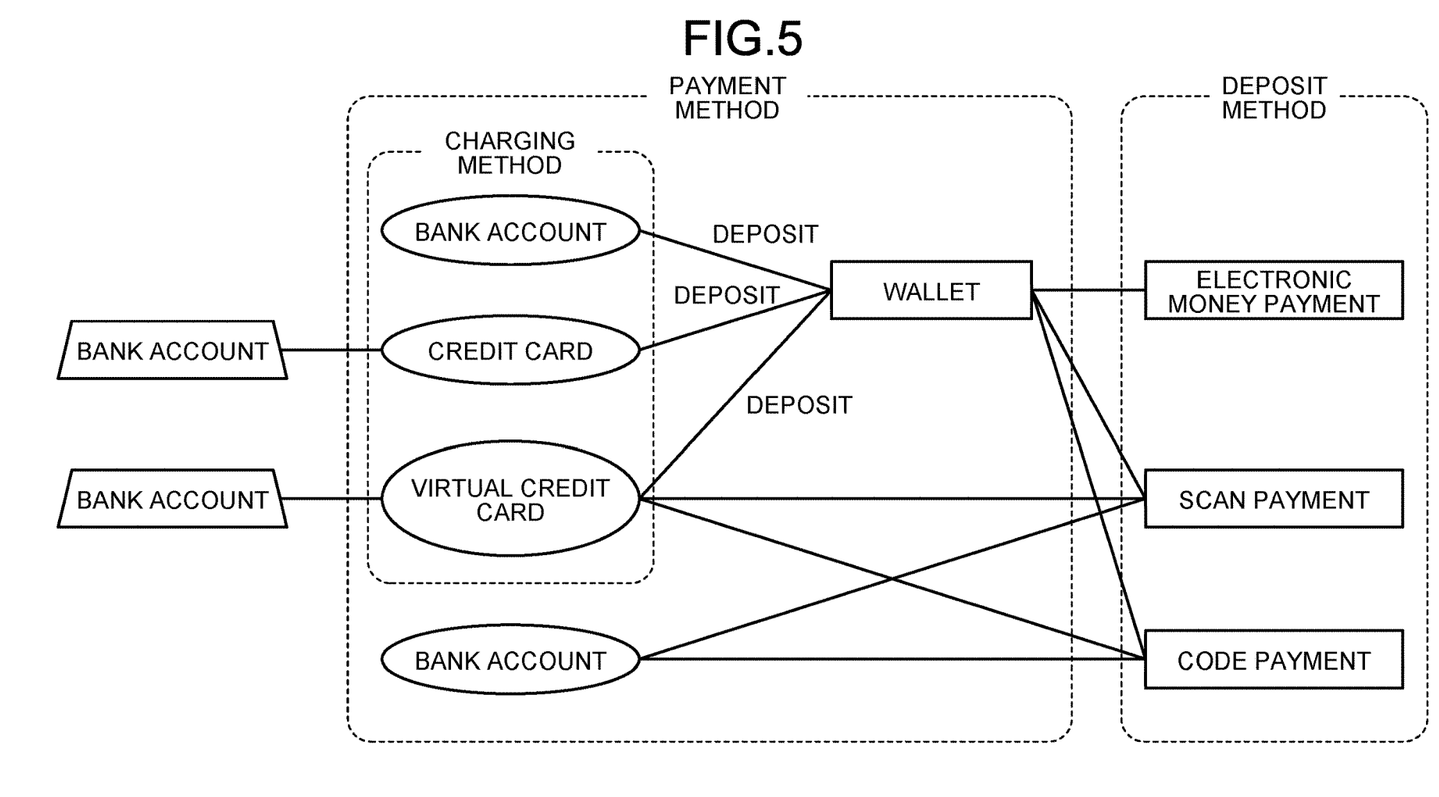
FIG. 5 is a diagram illustrating a relationship between a wallet and settlement methods.

FIG. 5 is a diagram schematically illustrating a relationship between the payment methods, the deposit methods, and the settlement methods. The "payment method" refers to a method that serves as a funding source when a settlement is made. Examples of the payment method include bank accounts, credit cards, virtual credit cards, and electronic money balances in wallets. A virtual credit card is an insubstantial credit card, and includes information such as a card number, an expiry date, and an authentication number (security code). In addition, a bank account is linked to each of the credit card and the virtual credit card, and a use amount of each card is withdrawn from the bank account at a later date.

The "deposit method" refers to a method of depositing electronic money to a wallet, which is a virtual deposit/withdrawal account. Examples of the deposit method include bank accounts, credit cards, and virtual credit cards out of the payment methods. By registering a bank account, a credit card, and a virtual credit card as deposit methods, deposit of electronic money into a wallet becomes possible.

The "settlement method" refers to a method of making a settlement using a payment method. Examples of the settlement method may include electronic money payment, scan payment, and code payment. Electronic money payment is a settlement made when the user terminal 30 is held over a predetermined position of the vehicle 40 without a contact between the short-range wireless communication unit 34 of the user terminal 30 and a short-range wireless communication unit 46 of the vehicle 40. Scan payment is a settlement made when a barcode or QR code (registered trademark) displayed on the vehicle 40 is read with a camera or the like of the user terminal 30. Code payment is a settlement made when a barcode or QR code (registered trademark) displayed on the user terminal 30 is read by a code reader or the like of the vehicle 40.

In the wallet system 1, any of the settlement methods of three types may be used by using the payment methods of three types. That is, in the wallet system 1, the payment methods and the settlement methods may be combined as described in (1) to (3) below.

(1) Electronic money payment, scan payment, and code payment using an electronic money balance in the wallet (2) Electronic money payment, scan payment, and code payment using a virtual credit card (3) Electronic money payment, scan payment, and code payment using a bank account In the wallet system 1 of the present embodiment, it is possible to deposit electronic money to a wallet by a plurality of payment methods, and it is possible to make a settlement from the electronic money balance deposited to the wallet through a plurality of settlement methods.

FIG. 4 is referred again. The settlement method registration unit 313 registers the payment methods to be registered as deposit methods also as settlement methods. That is, when a deposit method registration request is transmitted from the deposit method registration unit 312 to the wallet server 10, the settlement method registration unit 313 transmits a settlement method registration request, which causes the payment methods included in the deposit method registration request to be registered as settlement methods, to the wallet server 10.

For example, when the settlement method registration unit 313 registers a payment method (a bank account of bank A) as a deposit method, the settlement method registration unit 313 automatically registers the payment method (the bank account of bank A) also as a settlement method. Note that "registering a payment method as a settlement method" means enabling a settlement using the payment method as a payment source, and means, for example, enabling electronic money payment, scan payment, and code payment using a bank account of bank A as a payment source. The control unit 11 of the wallet server 10 that has received the settlement method registration request from the settlement method registration unit 313 stores the payment methods included in the settlement method registration request as the user information 131 in the memory 13, thereby registering the payment methods as the settlement methods.

The deposit processing unit 314 deposits electronic money to the wallet. Specifically, the deposit processing unit 314 transmits a deposit request to the wallet server 10 for depositing electronic money to the wallet by a payment method registered as a deposit method. The control unit 11 of the wallet server 10 that has received the deposit request from the deposit processing unit 314 increases the electronic money balance in the wallet based on deposit amount information included in the deposit request. That is, the control unit 11 updates the wallet information 132 stored in the memory 13 according to the increased amount of the electronic money balance in the wallet.

The settlement processing unit 315 makes a settlement by a payment method. The settlement processing unit 315 transmits a settlement request to the vehicle 40 to be ridden for making a settlement using any of a plurality of preset settlement methods (electronic money payment, scan payment, code payment) using electronic money deposited in the wallet. For example, when electronic money payment is made, the settlement processing unit 315 transmits a settlement request to the vehicle 40 through the short-range wireless communication unit 34. When scan payment is made, the settlement processing unit 315 transmits a settlement request to the vehicle 40 by reading a barcode or QR code (registered trademark) displayed on the vehicle 40 with the camera or the like of the user terminal 30. When code payment is made, the settlement processing unit 315 transmits a settlement request to the vehicle 40 by having the code reader or the like of the vehicle 40 read a barcode or QR code (registered trademark) displayed on the user terminal 30. The settlement request transmitted from the settlement processing unit 315 to the vehicle 40 may, but does not have to, include information indicating a settlement amount (hereinafter, referred to as "settlement amount information").

Subsequently, a control unit 41 of the vehicle 40 transmits a settlement request including the settlement amount information to the wallet server 10 via the network 2. The settlement processing unit 111 of the wallet server 10 that has received the settlement request from the vehicle 40 reduces the electronic money balance in the wallet based on the settlement amount information included in the settlement request. That is, the settlement processing unit 111 updates the wallet information 132 and the settlement information 133 stored in the memory 13 according to the reduced amount of the electronic money balance in the wallet.

The settlement processing unit 315 may also make a settlement by a payment method other than the electronic money balance in the wallet (for example, a bank account or a credit card). In this case, the settlement processing unit 315 transmits a settlement request to the wallet server 10 for making a settlement using any of a plurality of settlement methods by a bank account or a credit card. The settlement processing unit 111 of the wallet server 10 that has received the settlement request from the settlement processing unit 315 transmits the settlement amount information included in the settlement request to the settlement company server 20.

The memory 33 stores data of various screens displayed on the operation/display unit 35 by the display control unit 311. Further, in the memory 33, the user information 131, the wallet information 132, the settlement information 133, the advertisement information 135, and the like are continuously or temporarily stored as needed.

The short-range wireless communication unit 34 has a communication function conforming to a standard such as near field radio communication (NFC), Bluetooth (registered trademark) low energy (BLE), or infrared data association (IrDA), for example. For example, when electronic money payment is made, the user terminal 30 performs short-range wireless communication with the vehicle 40 through the short-range wireless communication units 34 and 46.

The operation/display unit 35 includes, for example, a touch panel display, and has an input function for accepting an operation by a user's finger, a pen, or the like and a display function for displaying various types of information based on the control by the display control unit 311.

The position information acquisition unit 36 receives, for example, a radio wave from a global positioning system (GPS) satellite and detects the position of the user terminal 30. Information about the position of the user terminal 30 detected by the position information acquisition unit 36 is stored in the memory 33.

Figure 6:
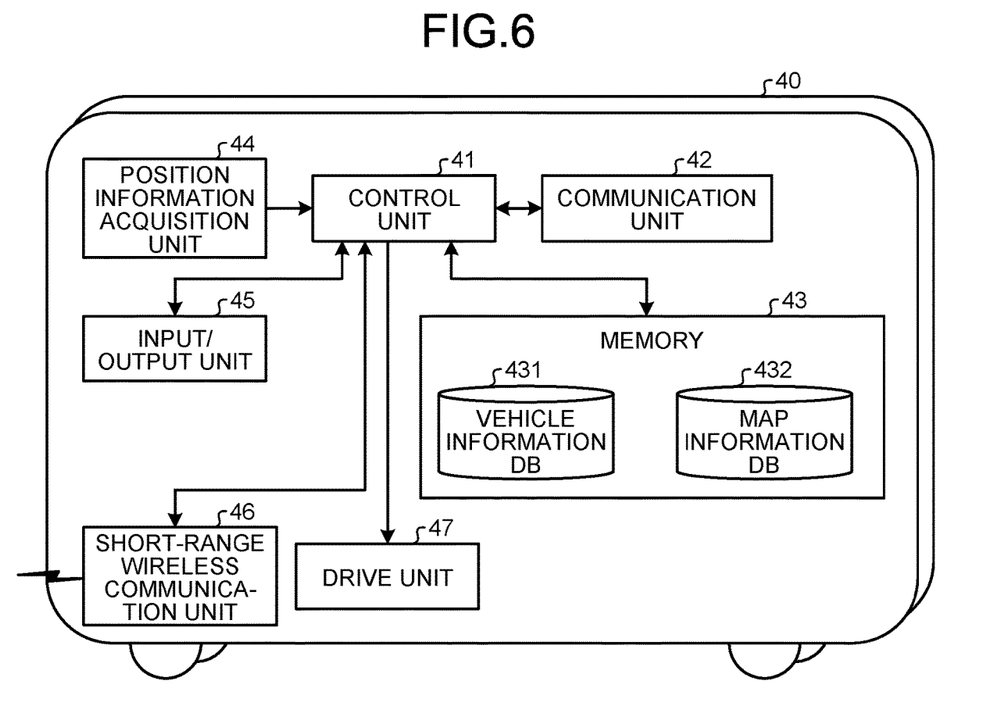
FIG. 6 is a block diagram illustrating a configuration of a vehicle illustrated in FIG. 1.

The vehicle 40 is a vehicle that travels by driving by a driver, or an autonomous traveling vehicle that is configured to autonomously travel according to a given traveling instruction. As illustrated in FIG. 6, the vehicle 40 includes the control unit 41, a communication unit 42, a memory 43, a position information acquisition unit 44, an input/output unit 45, the short-range wireless communication unit 46, and a drive unit 47.

The control unit 41, the communication unit 42, the memory 43, and the short-range wireless communication unit 46 have physical configurations similar to the control unit 11, the communication unit 12, the memory 13, and the short-range wireless communication unit 34, respectively.

The control unit 41 collectively controls the operations of various components mounted on the vehicle 40.

The communication unit 42 includes a data communication module (DCM) or the like that performs information communication with the wallet server 10 by wireless communication via the network 2.

The memory 43 includes a vehicle information database (vehicle information DB) 431 and a map information database (map information DB) 432. In the vehicle information database 431, various types of information including a vehicle ID of the vehicle 40, a user ID of the driver of the vehicle 40, an SOC of the battery mounted on the vehicle 40, a remaining fuel amount of the vehicle 40, traveling route information of the vehicle 40, vehicle type information of the vehicle 40, and the like are stored in an updatable manner.

The map information DB 432 stores map information. Here, the map information is information necessary for identifying the positions of roads, road structures, facilities, and the like, and includes, for example, data related to each node set on a road (for example, node ID, coordinates, etc.), data related to each link set on a road (for example, link ID, link name, connection node ID, road coordinates, road type (toll road, local road, etc.), the number of lanes, etc.), and feature data (for example, traffic lights, road signs, guard rails, facilities, etc.), and the like.

The position information acquisition unit 44 has a physical configuration similar to that of the position information acquisition unit 36. The position information of the vehicle 40 detected by the position information acquisition unit 44 is stored in the vehicle information database 431 so as to be retrievable. As a method of detecting the position of the vehicle 40, a method obtained by combining light detection and ranging, laser imaging detection and ranging (LiDAR) and a three-dimensional digital map may be adopted.

The input/output unit 45 includes a touch panel display, a speaker microphone, or the like. The input/output unit 45 as output means is configured such that input/output unit 45 may notify the outside of predetermined information by displaying characters, figures, etc. on the screen of the touch panel display or outputting voice from the speaker microphone according to the control by the control unit 41. Further, the input/output unit 45 as input means is configured to be able to input predetermined information to the control unit 41 by a user operating the touch panel display or projecting voice toward the speaker microphone. In the present embodiment, the vehicle 40 includes the position information acquisition unit 44 and the input/output unit 45 as separate functions, but the vehicle 40 may include an in-vehicle navigation system with a communication function having both functions of the position information acquisition unit 44 and the input/output unit 45 instead of the position information acquisition unit 44 and the input/output unit 45.

The short-range wireless communication unit 46 has a communication function conforming to a standard such as NFC, BLE, or IrDA, for example, and is provided at a predetermined position of the vehicle 40. When, for example, a user makes electronic money payment, the user holds the user terminal 30 over a predetermined position, whereby short-range wireless communication is performed with the user terminal 30 through the short-range wireless communication unit 46.

The drive unit 47 is a drive unit that drives the vehicle 40 for traveling. Specifically, the vehicle 40 is provided with an engine as a drive source, and the engine is configured to be able to generate electricity using an electric motor or the like by being driven by combustion of fuel. The generated electricity is charged into a rechargeable battery. Further, the vehicle 40 includes a drive transmission mechanism for transmitting the driving force of the engine, driving wheels for traveling, and the like.

The wallet system 1 having such a configuration provides a service according to the vehicle 40 and the driver of the vehicle 40 by performing the recording processing and the presentation processing described below. Hereinafter, an operation of the wallet system 1 when the recording processing and the presentation processing are performed will be described with reference to FIGS. 7 and 8.

Figure 7:
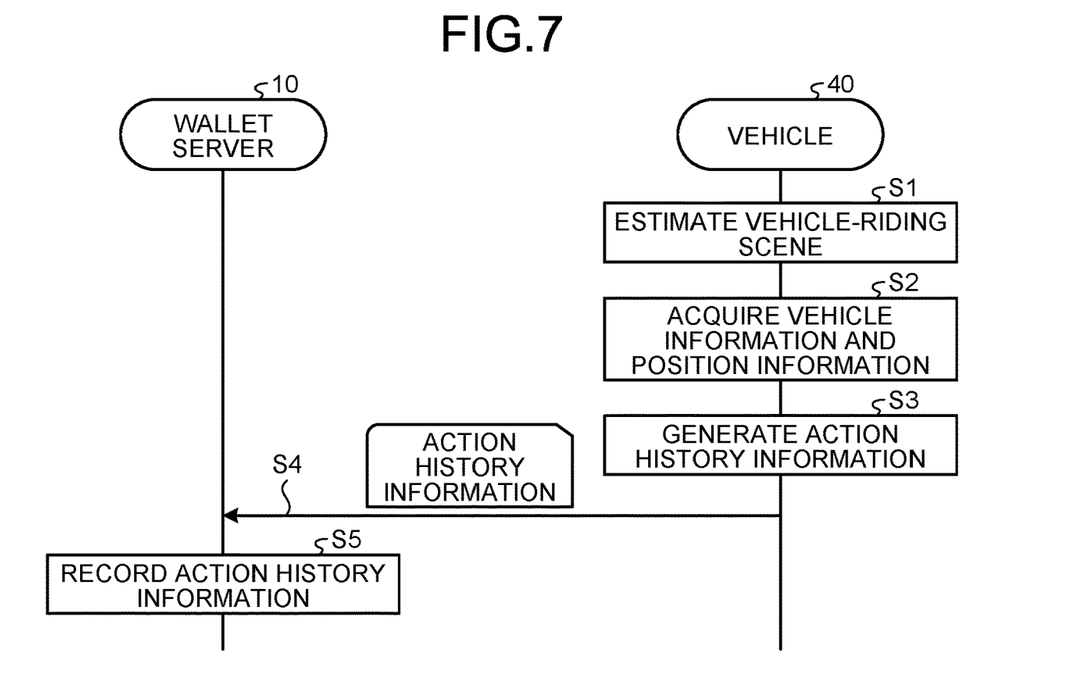
FIG. 7 is a timing chart illustrating a flow of recording processing according to the embodiment.

FIG. 7 is a timing chart illustrating the flow of the recording processing according to the embodiment. The timing chart illustrated in FIG. 7 starts at the timing when the ignition switch of the vehicle 40 is switched from the off state to the on state, and the recording processing proceeds to Step S1.

In Step S1, the control unit 41 estimates a vehicle-riding scene of a driver of the vehicle 40 based on a passenger of the vehicle 40. Specifically, in a case where there is no passenger, the control unit 41 estimates a vehicle-riding scene of a driver to be a scene in which the driver of the vehicle 40 goes out alone. On the other hand, in a case where passengers are family members of a driver, the control unit 41 estimates a vehicle-riding scene of the driver to be a scene in which the driver of the vehicle 40 goes out with the family. Whether the passengers are family members of the driver is discriminated by comparing information acquired from the user terminals 30 carried by the passengers, operation input by the passengers, face authentication, voice authentication, or the like with pre-registered information. The driver of the vehicle 40 and the user ID may also be identified in a similar way. Thus, Step S1 is completed, and the recording processing proceeds to Step S2.

In Step S2, the control unit 41 acquires the vehicle information stored in the vehicle information DB 431, and the position information of the vehicle 40 within a predetermined time from the time when the ignition switch is switched to the on state (for example, until the time when the ignition switch is switched to the off state next time). Thus, Step S2 is completed, and the recording processing proceeds to Step S3.

In Step S3, the control unit 41 generates, as action history information, information by linking the information about the vehicle-riding scene of the driver of the vehicle 40 estimated in Step S1 with the vehicle information and the position information of the vehicle 40 acquired in Step S2, and then transmits the action history information to the wallet server 10 via the network 2. The action history information includes at least information about the driver of the vehicle 40 (user ID, etc.), a vehicle-riding scene of the driver of the vehicle 40, position information and traveling route information (destination, etc.) of the vehicle 40, and information about the vehicle type of the vehicle 40. Thus, Step S3 is completed, and the recording processing proceeds to Step S4.

In Step S4, the control unit 11 of the wallet server 10 stores the action history information transmitted from the vehicle 40 in the memory 13. Thus, Step S4 is completed, and the series of recording processing ends.

Figure 8:
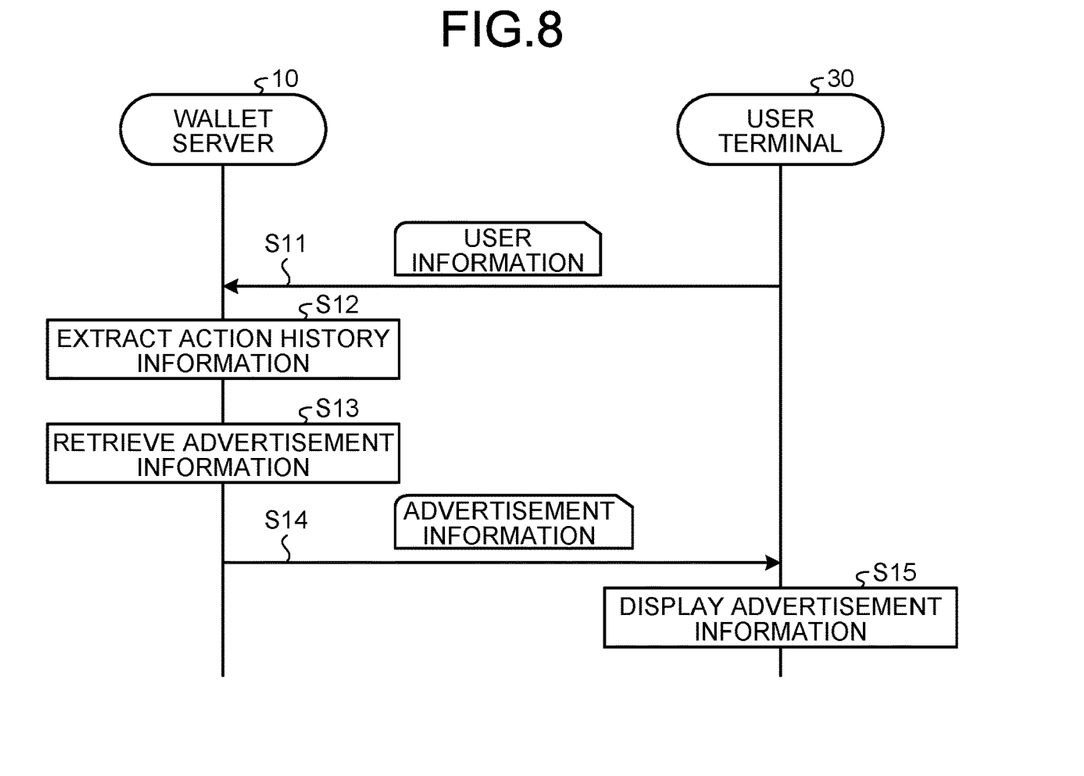
FIG. 8 is a timing chart illustrating a flow of presentation processing according to the embodiment.

FIG. 8 is a timing chart illustrating the flow of the presentation processing according to the embodiment. The timing chart illustrated in FIG. 8 starts at the timing when a user activates a settlement application program that involves settlement processing by operating the user terminal 30, and the presentation processing proceeds to Step S11.

In Step S11, the control unit 31 transmits user information including the user ID to the wallet server 10 via the network 2. Thus, Step S11 is completed, and the presentation processing proceeds to Step S12.

In Step S12, the service providing unit 112 extracts the action history information 134 corresponding to the user information transmitted in Step S1. Thus, Step S12 is completed, and the presentation processing proceeds to Step S13.

In Step S13, the service providing unit 112 retrieves the advertisement information 135 to be presented to the user based on the action history information 134 extracted in Step S12. Specifically, the service providing unit 112 retrieves the advertisement information 135 corresponding to the information of the vehicle-riding scene of the driver included in the action history information 134 based on data indicating a previously set correspondence between vehicle-riding scenes of the driver and genres of the advertisement information 135. For example, if the action history information 134 includes information indicating that a user driving a light vehicle visits a children's goods store, the service providing unit 112 retrieves the advertisement information 135 of a van-type vehicle that has a space enough for carrying a child. Further, if the action history information 134 includes information indicating that the user has visited a campsite, the service providing unit 112 retrieves an advertisement or a coupon of camping gear as the advertisement information 135. Thus, Step S13 is completed, and the presentation processing proceeds to Step S14.

In Step S14, the service providing unit 112 transmits the advertisement information 135 retrieved in Step S13 to the user terminal 30 via the network 2. Thus, Step S14 is completed, and the presentation processing proceeds to Step S15.

In Step S15, the display control unit 311 displays the advertisement information 135 and the coupon transmitted from the wallet server 10 in Step S14 on a display screen such as a settlement screen. Thus, Step S15 is completed, and the series of presentation processing ends.

As is clear from the above description, in the wallet system 1 according to the embodiment, the service providing unit 112 records the traveling route of the vehicle 40 and the information about the driver of the vehicle 40 as the action history information 134, selects a service to be provided to the driver based on the action history information 134, and provides a selected service to the driver. Thus, it is possible to provide a service according to the vehicle 40 or the driver of the vehicle 40.

According to the present disclosure, it is possible to provide a service according to a vehicle or a vehicle driver.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A system comprising:
a wallet server that is configured to communicate with a user terminal apparatus, a vehicle, and a settlement company server, the wallet server comprising a hardware processor being configured to:
manage a virtual deposit and withdrawal account of electronic money;
record information about a traveling route of the vehicle and a driver of the vehicle as action history information,
wherein a processor of the vehicle is configured to:
determine whether or not a passenger exists in the vehicle and determine a type of the passenger when the passenger exists;
estimate a riding scene of the driver based on a result of the determination; and
transmit the estimated riding scene to the wallet server to be stored as the action history information;
in response to receiving a request from the user terminal apparatus, extract the action history information associated with the request and select a service to be provided to the driver of the vehicle based on the extracted action history information including the estimated riding scene of the driver; and
provide the selected service on a settlement screen of the user terminal apparatus inside the vehicle, which is displayed when payment by the electronic money is processed via the settlement company server, wherein the service is not selected and is not provided until after the request is received from the user terminal apparatus; and
the user terminal apparatus that is configured to communicate with the wallet server and the vehicle, the user terminal apparatus comprising a hardware processor being configured to:
transmit the request to the wallet server; and
provide the service selected by the wallet server.

2. The system according to claim 1, wherein the action history information includes information about the passenger who is with the driver.

3. The system according to claim 1, wherein the action history information includes information about a destination of the vehicle.

4. The system according to claim 1, wherein the action history information includes information about a vehicle type of the vehicle.

5. The system according to claim 1, wherein the selected service is presentation of advertisement information.

6. The system according to claim 1, wherein the selected service is issuance of a coupon.

7. The system according to claim 1, wherein the processor of the wallet server is configured to provide a service selected via the user terminal apparatus operated by the driver.

8. The system according to claim 1, wherein the processor of the user terminal apparatus is configured to transmit a settlement request to the vehicle through short-range wireless communication, and the vehicle transmits the settlement request to the wallet server via network.

9. The system according to claim 1, wherein, in estimating the riding scene of the driver, the processor of the vehicle discriminates whether or not the passenger is a family member of the driver by comparing information acquired from at least one of the user terminal apparatus, an operation input by the passenger, and face or voice authentication in the vehicle, with pre-registered information.

10. A non-transitory computer-readable recording medium on which an executable program is recorded, the program causing a processor of a wallet server, which is configured to communicate with a user terminal apparatus, a vehicle, and a settlement company server, to execute:

managing a virtual deposit and withdrawal account of electronic money;

recording information about a traveling route of the vehicle and a driver of the vehicle as action history information, wherein a non-transitory computer-readable recording medium of the vehicle stores an executable program which causes a processor of the vehicle to perform:

determining whether or not a passenger exists in the vehicle and determining a type of the passenger when the passenger exists;

estimating a riding scene of the driver based on a result of the determination; and transmitting the estimated riding scene to the wallet server to be stored as the action history information;

in response to receiving a request from the user terminal apparatus, extracting the action history information associated with the request and selecting a service to be provided to the driver of the vehicle based on the extracted action history information including the estimated riding scene of the driver; and providing the selected service on a settlement screen of the user terminal apparatus inside the vehicle, which is displayed when payment by the electronic money is processed via the settlement company server, wherein the service is not selected and is not provided until after the request is received from the user terminal apparatus.

11. The non-transitory computer-readable recording medium according to claim 10, wherein the action history information includes information about the passenger who is with the driver.

12. The non-transitory computer-readable recording medium according to claim 10, wherein the action history information includes information about a destination of the vehicle.

13. The non-transitory computer-readable recording medium according to claim 10, wherein the action history information includes information about a vehicle type of the vehicle.

14. The non-transitory computer-readable recording medium according to claim 10, wherein the selected service is presentation of advertisement information.

\* \* \* \* \*